(12) United States Patent
Spies

(10) Patent No.: US 6,902,025 B2
(45) Date of Patent: Jun. 7, 2005

(54) ACCIDENT SENSOR

(75) Inventor: Hans Spies, Pfaffenhofen (DE)

(73) Assignee: Conti Temic microelectronic GmbH, Nürnberg (DE)

( * ) Notice: Subject to any disclaimer, the term of this patent is extended or adjusted under 35 U.S.C. 154(b) by 0 days.

(21) Appl. No.: 10/759,097

(22) Filed: Jan. 20, 2004

(65) Prior Publication Data
US 2004/0144587 A1 Jul. 29, 2004

Related U.S. Application Data

(60) Division of application No. 09/985,950, filed on Nov. 6, 2001, now abandoned, which is a continuation-in-part of application No. 09/319,952, filed as application No. PCT/EP98/06266 on Oct. 1, 1998, now abandoned.

(30) Foreign Application Priority Data

Oct. 14, 1997 (DE) .......................................... 197 45 309

(51) Int. Cl.$^7$ ............................. B60R 21/32; G01D 5/32
(52) U.S. Cl. ........................ 180/274; 280/735; 340/436
(58) Field of Search .......................... 180/274; 280/734, 280/735; 340/436

(56) References Cited

U.S. PATENT DOCUMENTS

| 4,346,914 A | 8/1982 | Livers et al. |
| 4,964,485 A | 10/1990 | Miele |
| 5,261,505 A | 11/1993 | Holroyd et al. |
| 5,335,749 A | 8/1994 | Taguchi et al. |
| 5,826,903 A | 10/1998 | Schiller et al. |

FOREIGN PATENT DOCUMENTS

| DE | 37 29 019 A1 | 3/1989 |
| DE | 42 41 382 A1 | 6/1993 |
| DE | 92 15 382.8 U1 | 4/1994 |
| DE | 92 15 383.6 U1 | 4/1994 |
| DE | 42 37 404 A1 | 5/1994 |
| DE | 43 08 353 C1 | 8/1994 |
| DE | 44 07 763 A1 | 9/1995 |
| DE | 196 02 990 A1 | 8/1996 |
| DE | 195 37 383 A1 | 4/1997 |
| DE | 197 32 302 A1 | 1/1999 |
| EP | 0 305 654 A2 | 3/1989 |
| EP | 0 445 907 A2 | 9/1991 |

*Primary Examiner*—Peter C. English
(74) *Attorney, Agent, or Firm*—Venable LLP; Catherine M. Voorhees

(57) ABSTRACT

An accident sensor for a motor vehicle for triggering a safety system is provided. A deformable and radiation transparent synthetic material part is penetrated by a defined quantity of light traveling in a beam path. A radiation sensitive detector optically detects the deformation of the material part by detecting a change in the beam path to determine a position of impact on the motor vehicle based on a signal waveform and a determination of the transit time between the impact and the detection of the signal. The material part is arranged externally on the motor vehicle.

2 Claims, 2 Drawing Sheets

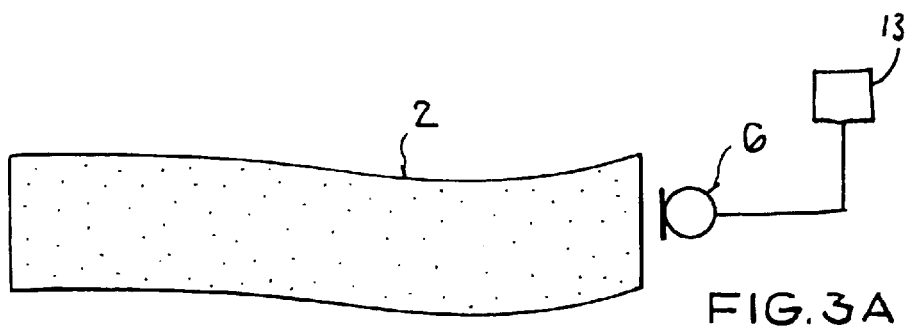
FIG. 3A
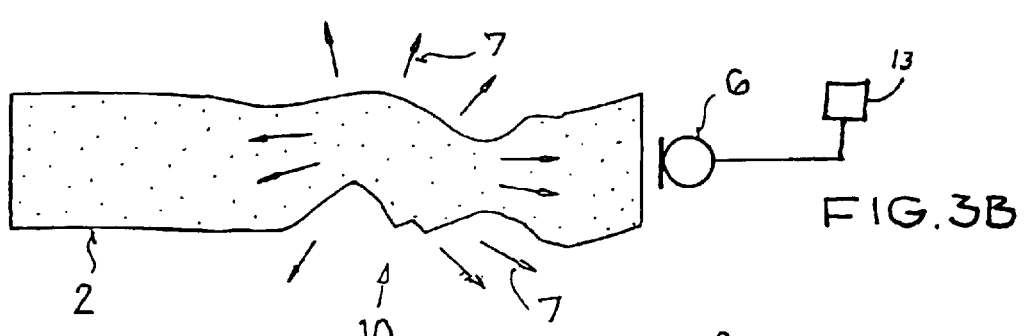
FIG. 3B
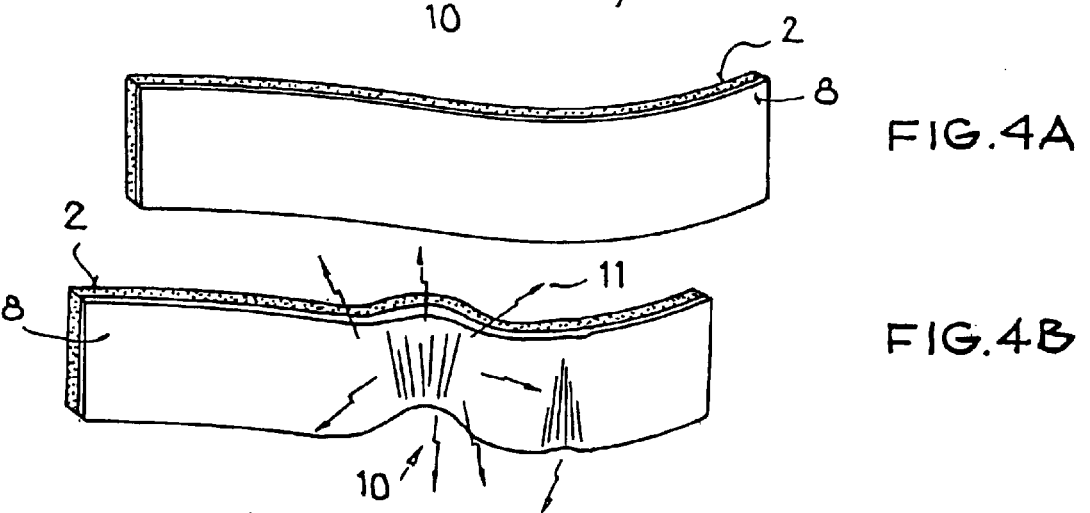
FIG. 4A
FIG. 4B
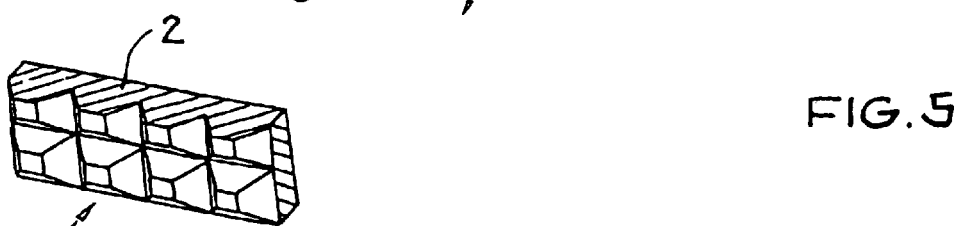
FIG. 5
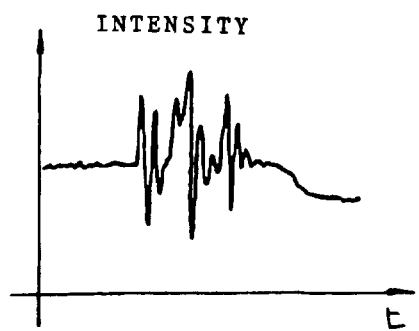
FIG. 6

ACCIDENT SENSOR

CROSS REFERENCE TO RELATED APPLICATIONS

This application is a divisional of U.S. application Ser. No. 09/985,950, filed Nov. 6, 2001, now abandoned, which is a continuation-in-part of U.S. application Ser. No. 09/319,952, filed Sep. 14, 1999, now abandoned, which was the National Stage of International Application No. PCT/EP98/06266, filed Oct. 1, 1998.

BACKGROUND OF THE INVENTION

The invention relates to an accident sensor for detecting an impact.

The accident sensors currently used are designed as so-called acceleration sensors. In the event of an accident, they detect the acceleration or deceleration that occurs upon impact. If the acceleration or deceleration exceeds a critical value, motor-vehicle safety devices, such as seat-belt tighteners or airbags, are triggered. Usually, a plurality of acceleration sensors is mounted to the motor vehicle, with each acceleration sensor detecting the acceleration or deceleration in one spatial direction for detecting a front or side impact, as well as rolling of the vehicle.

A disadvantage of these sensors is that an acceleration sensor is required for each spatial direction. Also, such sensors cannot determine the site of the impact. These systems do not directly determine the impact and the associated deformation of the motor vehicle, but only the acceleration or deceleration resulting from the deformation.

U.S. Pat. No. 4,346,914 discloses an impact-detection device that responds to acoustical oscillations in the bearing parts of the vehicle body. The acoustical signals are converted into electrical signals by one or more piezoelectric force sensors that is or are connected to one or more acoustical waveguides. The latter comprise thin steel tubes that extend from the central installation point of the sensor(s) into the regions of the body that are at risk for impact, and serve there in the acoustical coupling with bearing parts that are spot-welded at numerous locations. The signals are processed by a microprocessor. The signal processing constitutes the basis of the determination of an impact situation that would require the triggering of the passenger-restraint system.

A disadvantage of this system is that the sound waves are contained in a complicated tubular waveguide system, and transported from there to a central piezo-element that converts the sound waves into a voltage signal. This voltage signal is then conducted further to a microprocessor. Not only is the processing of the tubular system complex and costly, but it is not possible to ascertain the origin of the signal with this apparatus. It only recognizes the severity of the accident. The sensor cannot identify the site of the deformation.

DE 37 29 019 A1 describes a device for triggering a safety apparatus. In this case, due to the association of sound and/or structure-borne-sound sensors, a system is shifted in position for differentiating an impact against an obstacle from other, corresponding noises and disturbances under critical driving conditions.

BRIEF SUMMARY OF THE INVENTION

It is the object of the invention to provide an accident sensor that indicates the deformation of a motor vehicle upon impact against an obstacle, can be mounted simply and inexpensively, and identifies the deformation site on the motor vehicle.

In accordance with the invention, the object is accomplished by the features disclosed herein. The accident sensor acoustically, electrically or optically detects the material deformation occurring upon impact in a plastic part mounted to the exterior of the motor vehicle.

The advantages attained with the invention are that, first, the accident sensor can detect the precise accident site on the motor vehicle. Furthermore, this solution is very inexpensive and simple in comparison to other accident sensors. Hence, the safety apparatuses can be triggered more purposefully at no additional cost.

Advantageous modifications of the invention ensue. The plastic part is disposed around the entire motor vehicle and serves simultaneously as a bumper and/or a scratch guard. Moreover, the deformation site on the motor vehicle can be determined, particularly based on the signal course and the determination of the transit time due to the spatial orientation of the signal receivers.

BRIEF DESCRIPTION OF THE DRAWINGS

The figures illustrate embodiments of the invention. They show in:

FIG. 3A: the sound measurement on the plastic;

FIG. 3B: the acoustical accident detection based on material crackling;

FIG. 4A: plastic coated with a piezofilm;

FIG. 4B: the electromagnetic accident detection based on the destruction of the piezofilm;

FIG. 5: a profile layer;

FIG. 6: a graphic representation of accident.

DETAILED DESCRIPTION OF THE INVENTION

Figure 1:
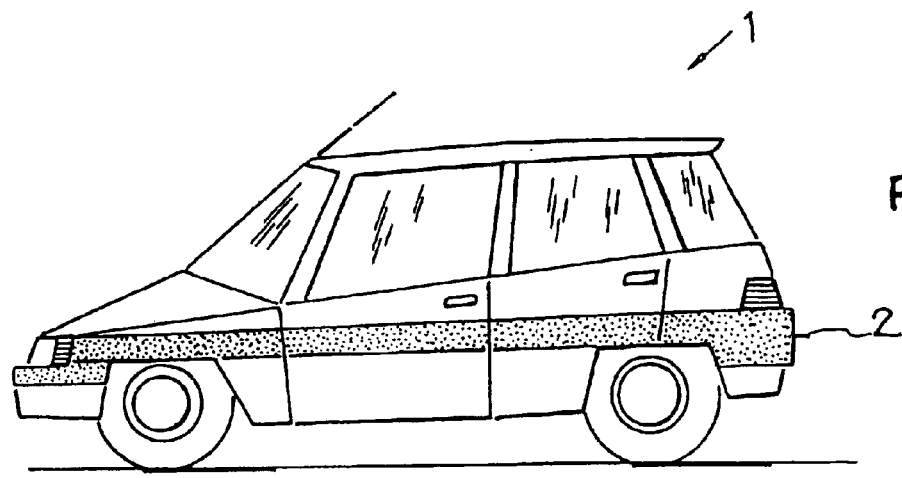
FIG. 1: a motor vehicle having a peripheral plastic layer.

FIG. 1 shows a motor vehicle 1 having a peripheral plastic layer 2. The illustrated motor vehicle 1 is completely or partially encompassed by plastic layer 2 in the impact regions. The plastic layer 2 encompassing the motor vehicle 1 in the lower region in the application example serves as a scratch guard and, in a minor rear-end collision or in the entrance or exit of a parking space, as impact protection for preventing damage to the paint or the body. This plastic layer 2, which is the first part to be damaged in most accidents, is or contains at least one part of the accident sensor. The plastic covering 2 can be disposed around the entire vehicle 1 or only part of it. In any event, however, the plastic covering 2 serves numerous purposes.

The nature of the plastic layer 2 is such that it generates a structure-borne-sound signal during the deformation, or its radiation transparency changes, or it generates an electrical signal by means of an integrated piezo-layer. An advantage here is that plastic typically possesses far better structure-borne-sound properties than metal. Thus, the plastic protective covering 2 on the motor vehicle 1 can be used simultaneously as a deformation-measuring element that acoustically transmits a material crackling that is typical for a specific degree of deformation, or optically or electrically transmits a different signal. The deformation site can be determined based on the transit times required by the signal from the deformation site to the signal receiver. If the plastic is provided with profiles, for example, the structure-bornesound signal generated during the deformation is more intensive and its measurement is less ambiguous, more exact and therefore more useful.

The plastic covering 2 can also comprise numerous layers possessing different properties, such as transparency or those of a piezo-layer.

Figure 2A:
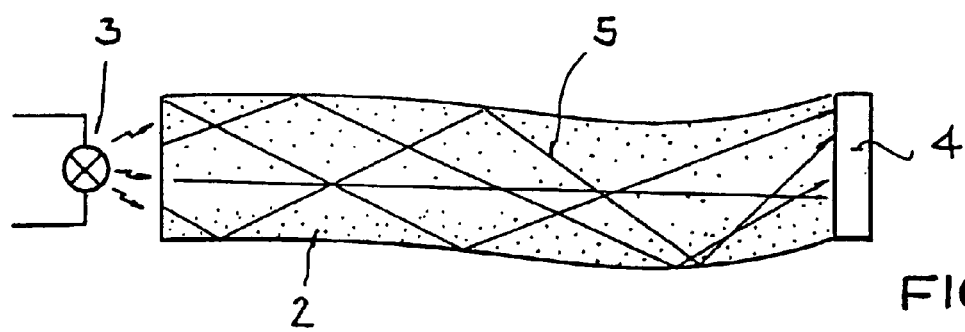
FIG. 2A: the measurement of the beam path in the plastic.

FIG. 2A illustrates the principle of the measurement of the radiation or the beam path 5 in the plastic layer 2. This figure shows a radiation-transparent plastic layer 2 disposed around a motor vehicle, as described in connection with FIG. 1. It is not crucial whether the entire plastic part 2 is radiation-transparent, or at least one radiation-transparent layer is disposed on or in the plastic. The structure further includes a radiation source 3 and a radiation detector 4. The radiation detector 4 measures the quantity of radiation or light that is transported from the radiation or light source via the light guide. The light guide should be shielded such that no radiation that is incident from the outside can reach the radiation detector 4. As long as the plastic part 2 is not damaged, the same quantity of light will reach the radiation detector 4.

Figure 2B:
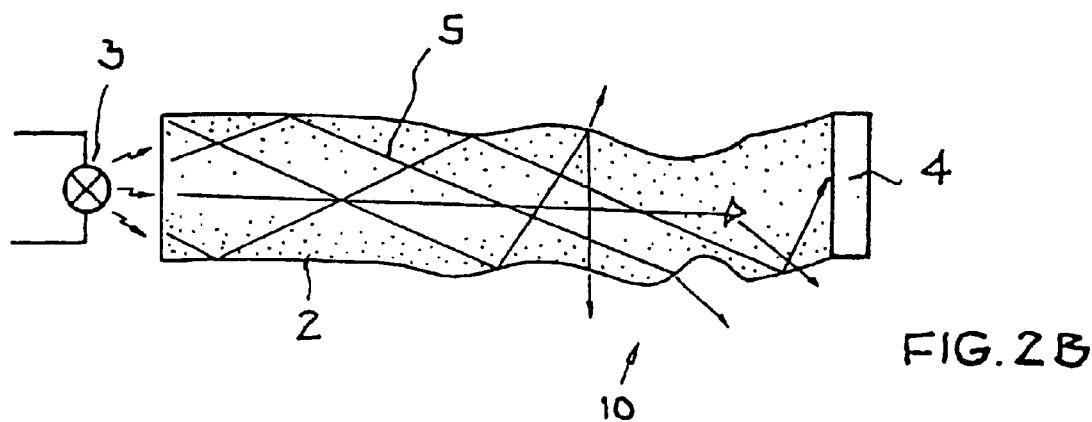
FIG. 2B: the optical accident detection based on a change in beam path.

FIG. 2B shows the optical accident detection based on the change in beam path in the event that the plastic layer 2 and, particularly, the light guide are damaged. During the deformation 10 of the plastic layer 2, the beam path 5 changes, and the quantity of radiation that reaches the radiation receiver 4 is reduced. The radiation transmitted by the radiation or light source 3 takes a different path from the one shown in FIG. 2A. Thus, both the distribution and the quantity of the radiation detected by the radiation detector 4 change. During the deformation 10 of the plastic layer 2, these parameters change constantly until the deformation process has ended. The change in the quantity of radiation over time, and the change in the radiation distribution over time, allow conclusions to be reached regarding the origin of the damage to the plastic. Evaluation electronics 13, (see FIG. 3A), as disclosed in DE 37 29 019 for example, determine the severity and source of the accident and the deformation site on the motor vehicle.

FIG. 3A shows the acoustical sound measurement on the plastic layer. A microphone 6, particularly a structure-borne-sound sensor, a directional microphone or another acoustical receiver, is disposed in the motor vehicle. The receiver is oriented toward the plastic layer 2. The sensitivity of the acoustical receiver lies in the range of the frequency spectrum of the structure-borne sound, particularly the material crackling of the plastic layer 2. The acoustical receiver 6 detects the acoustical signals generated through the deformation of the plastic layer 2. One or more receivers can be used for this purpose. The receivers can project in different spatial directions for using the transit time to determine the exact accident site. The signal is then conducted further via evaluation electronics 13. DE 37 29 019 describes an example of this type of electronics.

FIG. 3B shows the acoustical accident detection through the measurement of the structure-borne sound, particularly the material crackling. Structure-borne sound is generated during the deformation 10 of the plastic layer 2. This initiates a material crackling 7 in the ultrasonic range, which can be measured in the frequency range of 60 Hz to 100 Hz. A microphone 6 detects the intensity, phase position, damping and transit time in the material crackling specific for this plastic layer 2. Evaluation electronics disclosed in DE 37 29 019, for example, can use this data to determine the severity and origin of the accident, and the deformation site on the motor vehicle.

FIG. 4A shows the plastic layer 2 coated with a piezofilm 8. In this embodiment, a piezofilm 8 is applied to the plastic layer 2 or integrated with the plastic layer 2. The piezofilm 8 generates an electrical or optical signal under pressure or the effect of a mechanical force. Further included in this arrangement is a receiver for detecting the electrical or optical signal. This receiver is not shown in the figure because it is disposed directly on the plastic layer in an optical detection arrangement, as shown in FIG. 2A, or, in an electrical detection arrangement, at an arbitrary location that is electrically connected to the piezofilm.

FIG. 4B shows the electromagnetic accident detection based on the destruction of the piezofilm. During the deformation 10 or destruction, this piezofilm generates voltage signals or discharge flashes 11, which can be picked up by a detector. These signals are then conducted further to an evaluation unit, not shown, and evaluated there. An example of such an evaluation circuit is disclosed in DE 37 29 019.

FIG. 5 shows different profiles 9. These profiles can be worked into the plastic layer and/or the light guide for generating a better structure-borne-sound signal. If the piezofilm is applied to the plastic layer provided with profiles, more voltage signals or discharge flashes are generated due to mechanical stresses than in an application to a smooth base structure.

FIG. 6 illustrates the graphic representation of an accident. The diagram shows the so-called material crackling. The amplitude, or intensity, indicates the degree of the deformation. Different accident characteristics can be derived from the phase position and damping. Furthermore, the deformation site can be calculated through the determination of the transit time required by the sound signal for traveling from the deformed plastic to the microphone.

FIGS. 2A, 2B, 3A, 3B, 4A and 4B each show a deformable part that constitutes a signal transmitting medium. After the signal is created during impact, the deformable part transmits the acoustical, optical, or electrical signal to the receiver.

In each of the embodiments discussed above, the deformable part can either be distinct from or integral with the medium. For example, the deformable part can be the plastic part which serves as the continuous medium for transmitting a signal. Alternatively, the deformable part can be a distinct member attached to the plastic part.

In each of the embodiments discussed above, the impact site can be determined based on the signal course over the medium. Any suitable evaluation unit, for example, a microprocessor, can be provided for this function.

What is claimed is:

1. An accident sensor for triggering a safety system in a motor vehicle, comprising:
    a deformable and radiation transparent synthetic material part, wherein the material part is penetrated by a defined quantity of light traveling in a beam path; and
    a radiation sensitive detector that optically detects a deformation of the material part by detecting a change in the beam path to determine a position of impact on the motor vehicle based on a change in radiation received by the detector over time and a transit time of radiation from an impact site to the detector,
    wherein the material part is arranged externally on the motor vehicle.

2. The accident sensor of claim 1, wherein the material part forms a collision and scratch protector for the motor vehicle.

* * * * *